May 12, 1964     J. P. LINDSEY ETAL     3,133,254
SWITCH CIRCUIT FOR SIGNAL SAMPLING SYSTEM WITH GLOW TRANSFER
TUBES AND GATING MEANS PROVIDING SEQUENTIAL OPERATION
Filed June 15, 1961                         3 Sheets-Sheet 1

INVENTORS
J.P. LINDSEY
O.C. MONTGOMERY
BY
Hudson + Young
ATTORNEYS

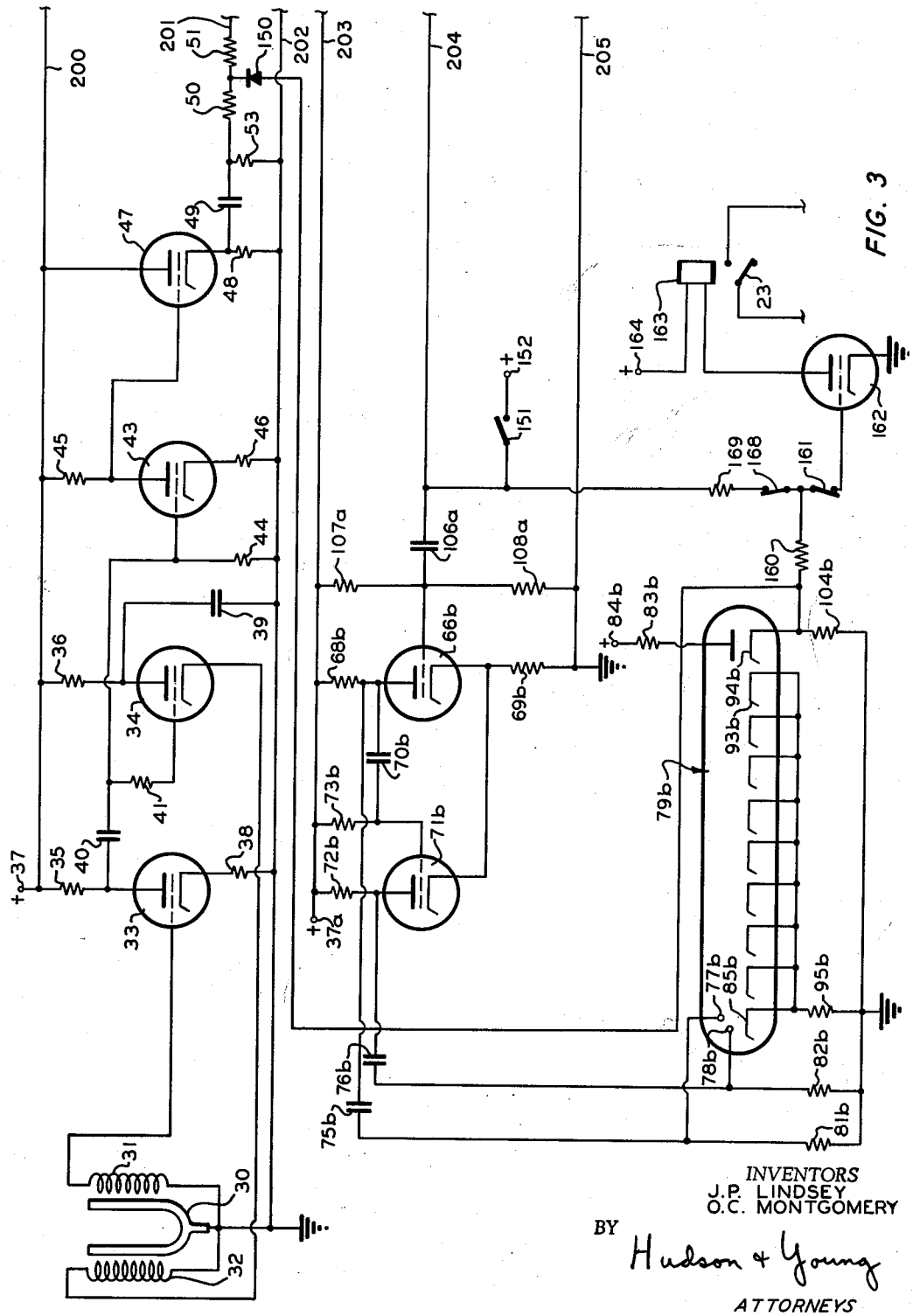

INVENTORS
J.P. LINDSEY
O.C. MONTGOMERY
BY
Hudson & Young
ATTORNEYS

United States Patent Office

3,133,254
Patented May 12, 1964

3,133,254
SWITCH CIRCUIT FOR SIGNAL SAMPLING SYSTEM WITH GLOW TRANSFER TUBES AND GATING MEANS PROVIDING SEQUENTIAL OPERATION
Joe P. Lindsey and Orin C. Montgomery, both of Bartlesville, Okla., assignors to Phillips Petroleum Company, a corporation of Delaware
Filed June 15, 1961, Ser. No. 117,203
5 Claims. (Cl. 328—104)

This invention relates to apparatus for selectively sampling and transmitting electrical signals from a plurality of sources.

As is well known, seismic surveying is a valuable procedure for measuring depths and slopes of subterranean formations. This information is particularly useful in locating oil deposits. A common method of seismic surveying involves imparting vibrations to the earth and measuring reflected vibrations that are subsequently received at the surface of the earth at locations spaced from the point at which the vibrations were imparted to the earth. By measuring the times of arrival of reflected vibrations in a plurality of records, it is possible to obtain information regarding the slope of subterranean reflecting formations. However, the identification of these reflected vibrations is often exceedingly difficult because random noise vibrations are present in the records which tend to obscure the desired reflections.

Various procedures have been devised for processing seismic records so that desired reflections can be recognized in the presence of random noise vibrations. One procedure that is particularly useful in many locations involves summing a plurality of individual records. The common reflections are added, whereas noise vibrations which occur at random times tend to cancel one another. However, this procedure requires that the individual records be adjusted with respect to one another so that common reflections occur at the same time and are added. The initial adjustment of the records in this manner is sometimes difficult because of the various corrections that must be made. If the seismometers are positioned different distances from the shot points, corrections must be made for the different lengths of travel paths of the reflected vibrations. If the seismometers are located at different elevations, corrections must be made for this factor. In many areas, the weathered layer near the surface of the earth varies in thickness so that the travel times of different reflected vibrations depend upon the distances they travel through this weathered layer. For these and other reasons, the initial adjustment of the records is often difficult.

A system has recently been developed which is capable of correlating seismic records in such a manner that common reflections appear at the same time in a resulting composite record. This is accomplished by a cross-correlation procedure. First and second signals to be correlated are multiplied by one another and the resulting product is integrated. This procedure is repeated a number of times with the original signals displaced from one another by varying amounts. The integrated product is a maximum when the signals are most nearly correlated with one another. The original signals can then be displaced from one another in accordance with the displacement that produces the best correlation and added to provide a composite record. This procedure compensates for many of the corrections that previously had been considered separately.

The multiplication and integration steps of this correlation procedure can be performed rapidly by transmitting the original signals through delay means having a plurality of spaced output terminals. The present invention provides an electrical switching system which is particularly useful in transmitting the output signals from the integrators in sequence to a common recording medium. This system comprises a plurality of glow transfer tubes. The discharge is transferred along the cathodes of the first tube in response to the output of an alternating signal generator. The remaining tubes are connected in series with the first tube and are actuated by transfer of the discharge from the last cathode of the preceding tube. A plurality of gate circuits are provided which are connected to the outputs of the signal sources. These gate circuits are selectively opened by respective coincident circuits which are controlled by the glow transfer tubes. In this manner, the individual gate circuits are opened sequentially in response to the discharge being transferred along the cathodes of the glow discharge tubes.

Accordingly, it is an object of this invention to provide apparatus for sequentially transmitting electrical signals from a plurality of sources.

Another object is to provide apparatus which is useful in interpreting seismic records.

Other objects, advantages and features of the invention should become apparent from the following detailed description which is taken in conjunction with the accompanying drawing in which:

FIGURES 3 and 3a are a schematic circuit drawing of the signal switching system of this invention.

Figure 1:
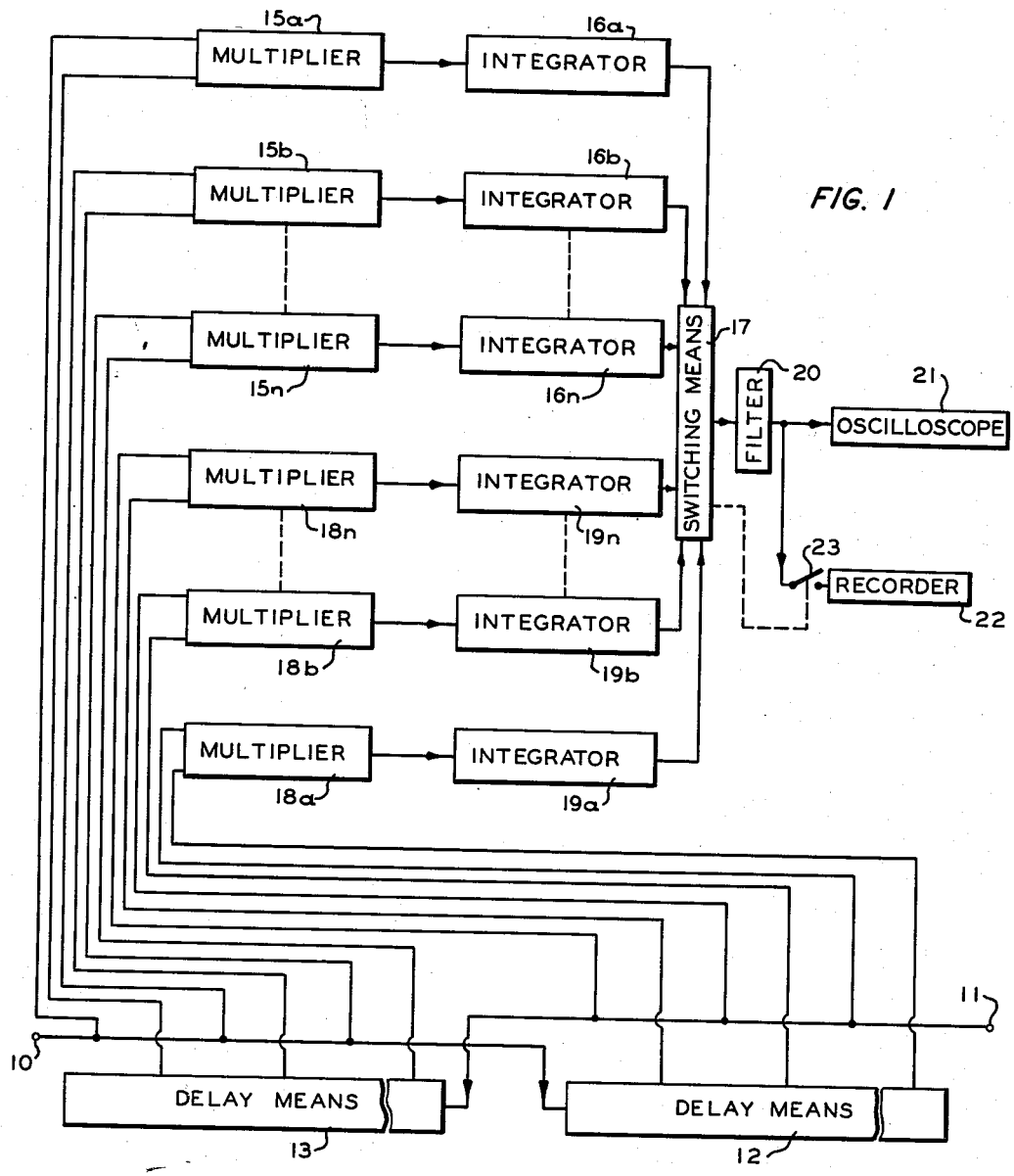
FIGURE 1 is a schematic representation of signal correlation apparatus which includes the switching system of this invention.

Referring now to the drawing in detail and to FIGURE 1 in particular, first and second electrical signals to be correlated, which can be respective seismic signals, are applied to respective input terminals 10 and 11. Terminals 10 and 11 are connected to the inputs of respective signal delay means 12 and 13. These delay means can be conventional electrical delay lines having a plurality of tapped output terminals, or they can be magnetic tapes which move past a plurality of pickup coils, for example. Input terminal 10 and the last output terminal of delay means 13 are connected to the respective input terminals of a first signal multiplier 15a. The output of multiplier 15a is applied through an integrator 16a to one of the inputs of a switching means 17. Input terminal 10 and the remainder of the output terminals of delay means 13 are likewise connected to respective inputs of a series of multipliers 15b . . . 15n. The outputs of multipliers 15b . . . 15n are applied through respective integrators 16b . . . 16n to respective inputs of switching means 17. Similarly, input terminal 11 and the spaced output terminals of delay means 12 are connected to the inputs of respective multipliers 18a, 18b . . . 18n. The outputs of multipliers 18a, 18b . . . 18n are applied through respective integrators 19a, 19b . . . 19n to respective inputs of switching means 17. Switching means 17 sequentially transmits all of the input signals applied thereto through an output filter 20 to an oscilloscope 21. The output signal of filter 20 is also applied to a recorder 22 when a switch 23 is closed. Switch 23 is controlled in the manner hereinafter described by switching means 17. The purpose of filter 20 is to smooth the output circuit from switching means 17 to provide a continuous signal.

Figure 2:
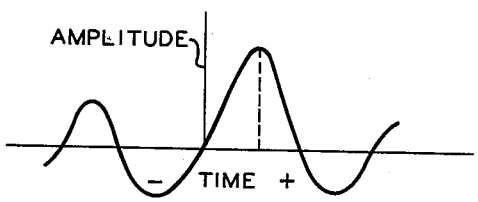
FIGURE 2 is a graphical representation of an operating feature of the apparatus of FIGURE 1.

An output signal of the type shown in FIGURE 2 is applied to oscilloscope 21 and/or recorder 22. The time axis of this curve is representative of the phase difference between the two signals which are multiplied by one another. The apparatus of FIGURE 1 thus effectively multiplies the two input signals a plurality of times when the signals are displaced from one another by varying times depending upon the delay established by delay means 12 and 13. The curve of FIGURE 2 exhibits a maximum when the signals being multiplied are most closely correlated to one another. The time at which this maximum occurs represents the phase difference by which one of the seismic signals should be displaced from the other for subsequent compositing. The signals are then so displaced and added to produce a composite record wherein common reflections are superimposed and random noise vibrations tend to be canceled.

Figure 3A:
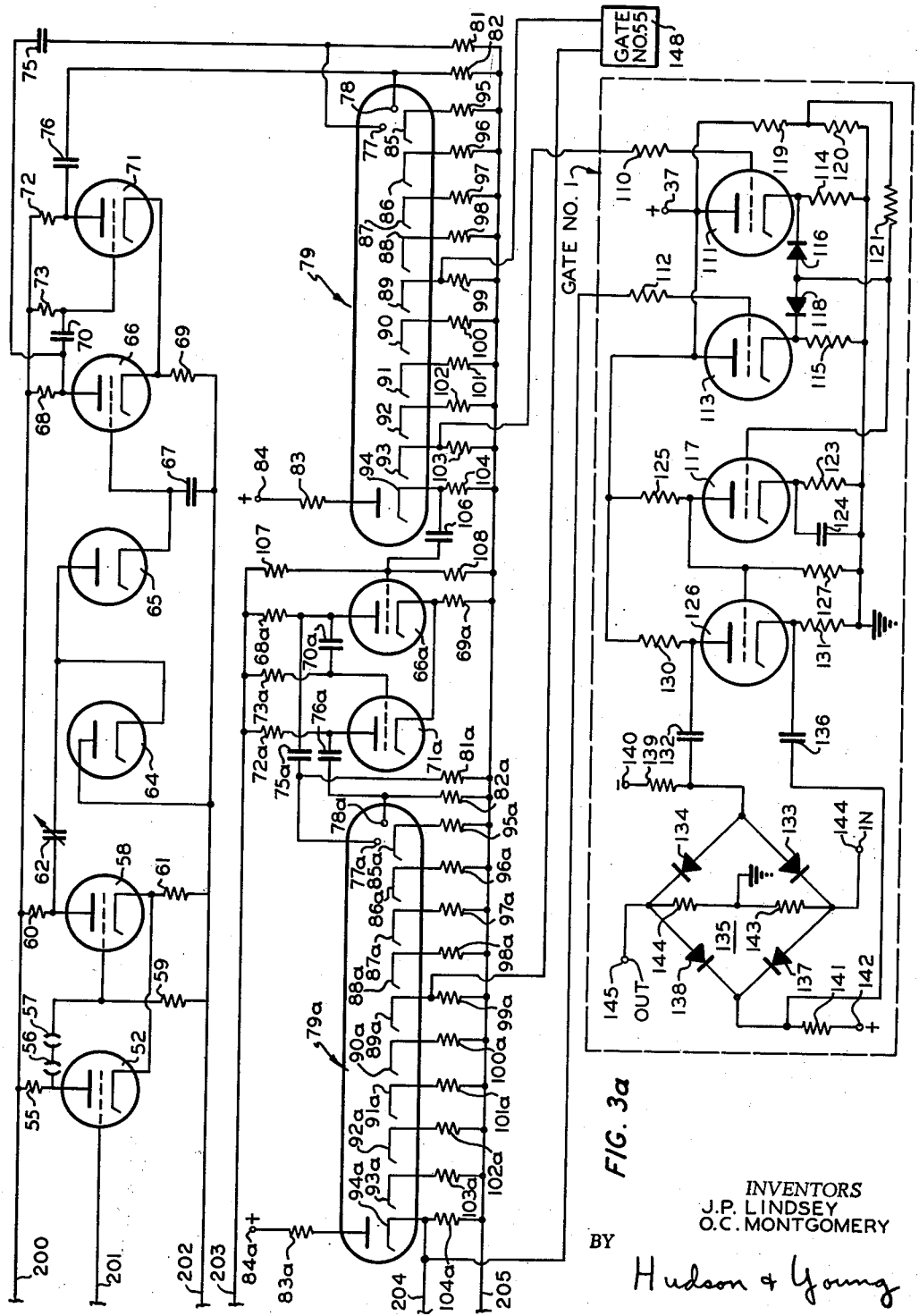

Switching means 17 is illustrated in detail in FIGURES 3 and 3a. The circuit of these figures is actuated by an oscillator which is controlled by a tuning fork 30. This tuning fork can vibrate at a frequency of 1,000 cycles per second, for example. First and second coils 31 and 32 are positioned adjacent the respective tines of tuning fork 30. First terminals of coils 31 and 32 are connected to the tuning fork and to ground. The second terminal of coil 31 is connected to the control grid of a triode 33. The second terminal of coil 32 is connected to the cathode of a second triode 34. The anodes of triodes 33 and 34 are connected through respective resistors 35 and 36 to a terminal 37 which is maintained at a positive potential. The cathode of triode 33 is connected to ground through a resistor 38. A capacitor 39 is connected between the anode of triode 34 and ground. The anode of triode 33 is connected through a capacitor 40 and a resistor 41 to the control grid of triode 34. The junction between capacitor 40 and resistor 41 is connected to the control grid of a triode 43. The control grid of triode 43 is connected to ground through a resistor 44.

Triodes 33 and 34 and the circuit elements associated therewith form a conventional oscillator, the frequency of which is regulated by tuning fork 30. The output signal of the oscillator is applied to triode 43 which forms the first stage of an amplifier circuit. The anode of triode 43 is connected through a resistor 45 to terminal 37, and the cathode of triode 43 is connected through resistor 46 to ground. The anode of triode 43 is also connected to the control grid of a triode 47. The anode of triode 47 is connected directly to terminal 37, and the cathode of triode 47 is connected through a resistor 48 to ground. The cathode of triode 47 is also connected through a capacitor 49 and resistors 50 and 51 to the control grid of a triode 52, see FIGURE 3a. Reference numerals 200 to 205 are employed to show the circuit connections between FIGURES 3 and 3a. The junction between capacitor 49 and resistor 50 is connected to ground through a resistor 53. Resistors 50, 51 and 53 are quite large so that the signal applied to triode 52 is of substantially the form of a square wave.

The anode of triode 52 is connected through a resistor 55 to terminal 37. The anode of triode 52 is also connected through neon tubes 56 and 57 to the control grid of a triode 58. The control grid of triode 58 is connected to ground through a resistor 59. The anode of triode 58 is connected through a resistor 60 to terminal 37, and the cathode of triode 58 is connected through a resistor 61 to ground. The anode of triode 58 is also connected to the first terminal of a variable capacitor 62.

The output signal applied to capacitor 62 from triode 58 has substantially a square wave form and can have a peak-to-peak amplitude of approximately 100 volts, for example. The maximum capacitance of capacitor 62 can be of the order of 0.55 microfarad. The second terminal of capacitor 62 is connected to the cathode of a first diode 64. The anode of triode 64 is connected to ground. The second terminal of capacitor 62 is also connected to the anode of a second diode 65. The cathode of diode 65 is connected to the control grid of a triode 66. A capacitor 67 is connected between the control grid of triode 66 and ground. Capacitor 67 can have a capacitance of the order of 0.0045 microfarad, for example.

The anode of triode 66 is connected through a resistor 68 to a terminal 37, and the cathode of triode 66 is connected through a resistor 69 to ground. The anode of triode 66 is connected through a capacitor 70 to the control grid of a triode 71. The cathode of triode 71 is connected to the cathode of triode 66. The anode of triode 71 is connected through a resistor 72 to terminal 37. The control grid of triode 71 is connected through a resistor 73 to terminal 37. The anodes of triodes 66 and 71 are connected through respective capacitors 75 and 76 to respective electrodes 77 and 78 which regulate the transfer of the discharge in a glow transfer tube 79. Electrodes 77 and 78 are connected to ground through respective resistors 81 and 82.

During the positive half cycle of the output signal from triode 58 capacitor 62 is charged through diode 65 to charge the upper plate of capacitor 67 positively. During the negative half cycle of the input signal, capacitor 62 discharges through diode 64. However, capacitor 67 retains some of its charge. This operation repeats during successive cycles of the output signal from triode 58 until the charge on capacitor 67 builds up to a value which is sufficient to fire triode 66. This can occur at the end of three cycles, for example. Triodes 66 and 71 form a multivibrator circuit with triode 71 normally being conductive. Conduction by triode 71 is extinguished momentarily when triode 66 conducts, but shortly thereafter the triodes are restored to their initial conditions. Thus, a pair of pulses are applied to electrodes 77 and 78 each time triode 66 conducts. These pulses serve to transfer the discharge between adjacent cathodes of glow transfer tube 79.

The anode of tube 79 is connected through a resistor 83 to a terminal 84 which is maintained at a positive potential. The cathodes 85 to 94 of tube 79 are connected to ground through respective resistors 95 to 104. The last cathode 94 is connected through a capacitor 106 to the control grid of a triode 66a. The control grid of triode 66a is connected through a resistor 107 to terminal 37 and through a resistor 108 to ground.

A positive pulse is applied from cathode 94 of glow transfer tube 79 through capacitor 106 to the control grid of triode 66a after each series of ten pulses has been applied to the input of tube 79 from the multivibrator circuit formed by triodes 66 and 71. Triodes 66a and 71a and the circuit elements associated therewith form a second multivibrator circuit which applies pulses to electrodes 77a and 78a of glow transfer tube 79a. Thus, a single pulse is applied to tube 79a for each tenth input pulse applied to tube 79. In a similar fashion, cathode 94a of tube 79a is connected through a capacitor 106a to the control grid of a triode 66b. Triodes 66b and 71b and the circuit elements associated therewith form a third multivibrator circuit which applies pulses to electrodes 77b and 78b of a third glow transfer tube 79b. A single pulse is thus applied to tube 79b for each one hundred pulses applied to tube 79.

The switching means of this invention includes a plurality of gate circuits which are actuated by glow transfer tubes 79 and 79a. The first of these gate circuits is designated as Gate No. 1 in FIGURE 3. Cathode 93 of tube 79 is connected through a resistor 110 to the control grid of a triode 111. The cathode 94a of tube 79a is connected through a resistor 112 to the control grid of a triode 113. The anodes of triodes 111 and 113 are connected to positive potential terminal 37. The cathodes of triodes 111 and 113 are connected to ground through respective resistors 114 and 115. The cathode of triode 111 is connected through a rectifier 116 to the control grid of a triode 117, and the cathode of triode 113 is connected through a rectifier 118 to the control grid of triode 117. Resistors 119 and 120 are connected in series between positive potential terminal 37 and ground. The junction between these resistors is connected through a resistor 121 to the control grid of triode 117.

The cathode of triode 117 is connected to ground through a resistor 123 which is shunted by a capacitor 124. The anode of triode 117 is connected through a resistor 125 to terminal 37. The anode of triode 117 is also connected directly to the control grid of a triode 126. The control grid of triode 126 is connected to ground through a resistor 127. The anode of triode 126 is connected through a resistor 130 to terminal 37, and the cathode of triode 126 is connected to ground through a resistor 131.

The anode of triode 126 is connected through a capacitor 132 to the junction between rectifiers 133 and 134 which form respective arms of a bridge network 135. The cathode of triode 126 is connected through a capacitor 136 to the junction between rectifiers 137 and 138 of bridge network 135. The junction between rectifiers 133 and 134 is connected through a resistor 139 to a terminal 140 which is maintained at a negative potential. The junction between rectifiers 137 and 138 is connected through a resistor 141 to a terminal 142 which is maintained at a positive potential. The junction between rectifiers 133 and 137 is connected to ground through a resistor 143, and the junction between rectifiers 134 and 138 is connected to ground through a resistor 144. The junction between rectifiers 133 and 137 is also connected to an input terminal 144. The junction between rectifiers 134 and 138 is connected to an output terminal 145.

The input signal applied to terminal 144 is the output signal of integrator 16a of FIGURE 1, for example. This signal is actually applied between terminal 144 and ground. The output signal from terminal 145 is applied to the input of filter 20 of FIGURE 1. Gate No. 1 is actuated when the first pulse is applied to glow transfer tube 79 to transfer the discharge from cathode 94 to cathode 93. At this time, the discharge is from cathode 94a in tube 79a. Triodes 111 and 113 initially operate so that some conduction takes place prior to this time. The junction between resistors 119 and 120 is maintained at a positive potential which is above the potentials on the cathodes of triodes 111 and 113 so that conduction takes place through diodes 116 and 118 to limit the potential on the control grid of triode 117. When the discharges are from cathodes 93 and 94a, positive potentials are applied to the control grids of triodes 111 and 113 from respective cathodes 93 and 94a. These positive potentials increase conduction through the two triodes to increase the cathode potentials thereof. This increase is sufficient to block conduction through diodes 116 and 118 so that an increased positive potential is applied to the control grid of triode 117. This higher potential increases the conduction by triode 117 to reduce the potential on the control grid of triode 126 by an amount sufficient to extinguish conduction by triode 126. Accordingly, a positive pulse is applied through capacitor 132 to bridge network 135 and a negative pulse is applied through capacitor 136 to bridge network 135.

The bridge network initially is biased by the potentials applied to terminals 140 and 142 such that diodes 133, 134, 137 and 138 do not conduct and thereby present high impedance. Under this condition, there is no transfer of the input signal to output terminal 145. However, the positive and negative pulses from triode 126 reduce the impedance of the diodes to open the gate and permit transfer of the input signal from terminal 144 to output terminal 145. In this manner, the output signal from integrator 16a is applied through switching means 17 to filter 20 of FIGURE 1. It is necessary that positive potentials be applied to control grids of both of the triodes 111 and 113 simultaneously from respective glow transfer tubes 79 and 79a in order for the gate circuit to be opened. Otherwise, the potential applied to the control grid of triode 117 is not sufficiently large to cut-off triode 126 to open the gate.

There are as many gate circuits provided in accordance with this invention as there are integrator circuits in FIGURE 1. A second gate circuit designated as Gate No. 55, for example, is shown as element 148. This gate is connected to cathode 89 of tube 79 and to cathode 89a of tube 79a. Gate No. 55 is thus opened when the discharge in the two glow transfer tubes is from these cathodes. Each tenth input pulse to tube 79 results in a single pulse being applied to tube 79a so that a total of 100 gate circuits can be utilized in conjunction with tubes 79 and 79a.

As previously mentioned, it is desirable to display the output signal from filter 20 on the oscilloscope 21 a number of times to permit the operator to observe the general pattern of the output signal. Under normal operation, the scanning steps described repeat if the input signals are repetitively applied to terminals 10 and 11 of FIGURE 1. This can readily be accomplished if the input signals have initially been recorded on magnetic tapes on a drum recorder and the drum rotation is continuous. Glow transfer tube 79b is provided to terminate this scanning operation after ten cycles. All of the cathodes of tube 79b except cathode 94b are connected to ground through a common resistor 95b. Cathode 94b is connected to ground through a resistor 104b. This cathode is also connected through a rectifier 150 to the junction between resistors 50 and 51. When the discharge reaches the last cathode 94b of tube 79b, a positive pulse is applied through rectifier 150 to the control grid of triode 52. This pulse terminates the application of pulses to tube 79 so that the scanning operation is terminated. The operation can again be started manually by closing a switch 151 which applies a positive pulse from positive potential terminal 152 through capacitor 106a to triode 66b. This pulse initiates the multivibrator formed by triodes 66b and 71b so that one set of pulses is applied to tube 79b to transfer the discharge back to the first cathode 85b.

The ten cycles of scanning described above normally are sufficient for the operator to determine visually that the records are properly being combined. At the end of the tenth cycle it is desirable to actuate recorder 22 of FIGURE 1 to provide a permanent record of the output of the multiplier and integrator. Cathode 94b of glow transfer tube 79b is connected through a resistor 160 and a normally closed switch 161 to the control grid of a triode 162. The cathode of triode 162 is connected to ground, and the anode thereof is connected through a relay coil 163 to a terminal 164 which is maintained at a positive potential. When a positive pulse is applied to the control grid of triode 162, the tube conducts to energize relay 163 to close switch 23. In the event the operator should determine that the records are not properly being combined, switch 161 can be opened manually to prevent the recorder from being actuated.

The junction between resistor 160 and switch 161 is connected through a switch 168 and a resistor 169 to capacitor 106a. A positive potential on cathode 94b thus actuates triode 66b to reset the scanning mechanism automatically, if desired. Capacitor 106a is connected through a switch 151 to a terminal 152 which is maintained at a positive potential. Closure of switch 151 thus applies a positive pulse through capacitor 106a to the grid of triode 66b to trigger tube 79b.

In view of the foregoing description, it should be apparent that there is provided in accordance with this invention an improved circuit for selectively sampling and transmitting electrical signals from a plurality of sources. The circuit of this invention is particularly useful in the interpretation of seismic signals, but is by no means limited thereto.

While the invention has been described in conjunction with a present preferred embodiment, it should be apparent that it is not limited thereto.

What is claimed is:

1. Electrical signal sampling apparatus comprising first, second and third glow transfer tubes, each having an anode, a plurality of cathodes and signal transfer electrodes; first signal generating means connected to the transfer electrodes of said first glow transfer tube to provide a series of pulses; second signal generating means connected to the transfer electrodes of said second glow transfer tube; third signal generating means connected to the transfer electrodes of said third glow transfer tube; means responsive to the passage of current through a preselected cathode of said first glow transfer tube to actuate said second signal generating means to apply one set of pulses to said second glow transfer tube; means responsive to the passage of current through a preselected cathode of said second glow transfer tube to actuate said third signal generating means to apply one set of pulses to said third glow transfer tube; a plurality of electrical gate circuit means, each having an input and an output; a plurality of coincidence circuit means, each adapted to transmit an output signal when two input signals thereto exceed preselected values; means connecting the outputs of said coincidence circuit means to respective ones of said gate circuit means to open same; means connecting the inputs of each of said coincidence circuit means to respective cathodes of said first and second glow transfer tubes; an oscilloscope; a recorder; means connecting the outputs of said gate circuit means to said oscilloscope so that said oscilloscope displays signals transmitted sequentially through said plurality of gate circuit means; and means connected to one of the cathodes of said third glow transfer tube to connect said recorder to the outputs of said gate circuit means when said one cathode conducts.

2. The apparatus of claim 1, further comprising means responsive to the passage of current through a preselected cathode of said third glow transfer tube to terminate operation of said first signal generating means.

3. The apparatus of claim 1 wherein each of said gate circuit means comprises a bridge network having first, second, third and fourth terminals; a first rectifier connected between said first and second terminals to permit passage of current from said first terminal to said second terminal; a second rectifier connected between said first and third terminals to permit passage of current from said first terminal to said third terminal; a third rectifier connected between said second and fourth terminals to permit passage of current from said second terminal to said fourth terminal; a fourth rectifier connected between said third and said fourth terminals to permit passage of current from said third terminal to said fourth terminal; a first resistor connected between said second terminal and a region of reference potential; a second resistor connected between said third terminal and said region of reference potential; means applying a bias potential to said fourth terminal which is positive with respect to said reference potential; and means applying a bias potential to said first terminal which is negative with respect to said reference potential, said second terminal and said third terminal forming an input and an output, respectively, of said gate circuit means.

4. The apparatus of claim 1 wherein each of said coincidence circuit means comprises first and second electron tubes, each having an anode, a cathode and a control grid, said control grids forming the input terminals; means applying a potential which is positive with respect to a reference potential to the anodes of said first and second tubes; first and second resistors connected between the cathodes of said first and second tubes, respectively, and a region of said reference potential; an output terminal; means applying a potential to said output terminal which is positive with respect to said reference potential; and first and second rectifiers connected between said output terminal and the cathodes of said first and second tubes, respectively, to permit current flow from said output terminal to said cathodes.

5. The apparatus of claim 1 wherein each of said signal generating means comprises a multivibrator circuit adapted to provide a pair of output pulses 180° out of phase with one another when a single input pulse is applied thereto.

References Cited in the file of this patent

UNITED STATES PATENTS

| 2,862,114 | Solomon | Nov. 25, 1958 |
| 2,871,399 | Scuitto | Jan. 27, 1959 |
| 2,965,771 | Finkel | Dec. 20, 1960 |
| 2,994,062 | Chiapuzio et al. | July 25, 1961 |

FOREIGN PATENTS

| 750,836 | Great Britain | June 20, 1956 |